No. 710,445.  J. J. FELDER.  Patented Oct. 7, 1902.
HOOK.
(Application filed May 5, 1902.)
(No Model.)

J. J. Felder  Inventor

Witnesses
John Maupin
H. J. Shepard

By
Attorney

UNITED STATES PATENT OFFICE.

JESSE JUDSON FELDER, OF NAVASOTA, TEXAS.

HOOK.

SPECIFICATION forming part of Letters Patent No. 710,445, dated October 7, 1902.

Application filed May 5, 1902. Serial No. 106,066. (No model.)

*To all whom it may concern:*

Be it known that I, JESSE JUDSON FELDER, a citizen of the United States, residing at Navasota, in the county of Grimes and State of Texas, have invented a new and useful Hook, of which the following is a specification.

This invention relates to hooks, and has for its object to provide an improved device which is especially adapted for use in connection with harness. It is furthermore designed to dispense with springs and movable parts and at the same time to effectually guard against accidental disconnection of the hook from a ring or the like.

Another object is to facilitate the engagement and disengagement of the hook and to provide for convenience in manipulating the same with gloved or mittened hands in order that the hook may be conveniently connected and disconnected in severe winter weather.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
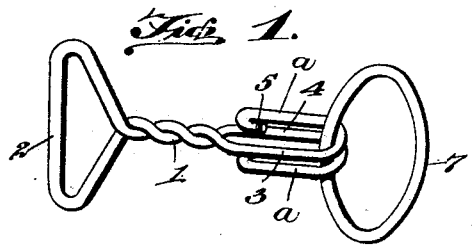
Figure 2:
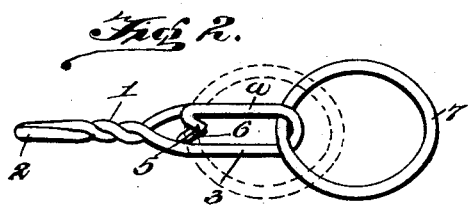
Figure 3:
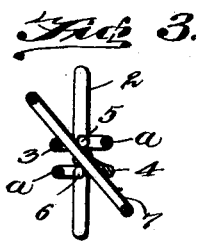
Figure 5:
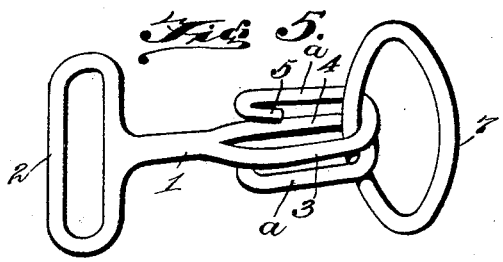
Figure 4:
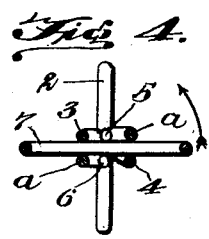

In the drawings, Figure 1 is a perspective view of the improved hook formed of a single length of wire. Fig. 2 is a plan view thereof. Fig. 3 is a cross-sectional view showing one of the relative positions of the hook and ring in disengaging the hook. Fig. 4 is a similar view with the hook and ring disposed for final separation. Fig. 5 is a perspective view showing the hook cast in a single piece.

Like characters of reference designate corresponding parts in all the figures of the drawings.

Referring to the accompanying drawings, 1 designates the shank of the hook, and 2 a terminal loop for engagement with a strap or the like. As shown in Fig. 1, the hook is formed of wire, which is first bent to form the loop or eye 2 and then twisted to produce the shank 1, while in Fig. 5 these parts have been shown cast. The forward end of the shank is forked or bifurcated and has the fork members 3 and 4, respectively. Each of these members is in the form of an elongated loop, which is closed at its outer end, and the two loops lie in substantially parallel planes. The bill *a* of each hook overlaps the body portion of the other hook, and the extremities of the bill terminate short of the rear closed end of the bifurcation and are extended inwardly and forwardly, as at 5 and 6, respectively, to form stops which overlap each other in a longitudinal plane which is disposed substantially at right angles to the parallel planes of the fork members, as clearly indicated in Figs. 3 and 4.

To engage the hook with a ring 7, the latter is moved rearwardly between the fork members 3 and 4, as indicated in Fig. 4, until the rear side of the ring passes the terminals of the fork members, after which the ring is turned in the direction indicated by the arrow in Fig. 4, or a reverse turn is given to the hook until relative turning of the parts is stopped by engagement of the ring with the opposite fork members, which position is shown in Fig. 3, and then the ring is drawn forwardly, so as to pass between the spaced overlapped terminals 5 and 6 and the ring finally disposed within the loops of the fork members. After the ring has been engaged with the hook it will be observed that the stop-terminals 5 and 6 prevent the ring from being forced to the rear extremity of the bifurcation, except when the ring has been disposed in an inclined position to pass between the spaced and overlapped stops 5 and 6, and should this accidentally occur the ring cannot become displaced unless it is given another reverse turn to bring it into a plane parallel with and between the fork members. However, such accidental turning of the ring or hook is practically impossible, and there is but slight possibility that the parts might become disengaged.

I am aware of lap-hooks somewhat similar to the present device; but the lapped hook members normally lie in mutual engagement and are elastic, so that they may be separated to receive and release a ring, which separation of parts is very difficult to accomplish with gloved or mittened hands, and it is to overcome this difficulty that the present device has been especially designed. In this connection it will be noted that the essential feature of difference embodied in the present device resides in the fact that it is not necessary to have the fork members of the hook elastic, as it is not intended that they should be sprung apart to receive the ring. The fork members are practically rigid and are spaced so as to receive the ring without forcing them apart, and therefore the hook may be cast as shown in Fig. 5 and need not be formed of wire or other elastic material.

From the foregoing description it is apparent that all movable parts, and particularly spring-actuated parts, are dispensed with and all parts of the hook are practically rigid, so that it is not necessary to spring the hook members apart to receive or release the ring, whereby the hook may be conveniently handled in very cold weather with gloved or mittened hands. Moreover, the device consists, essentially, of a straight shank having one end provided with a loop for engagement with a strap or the like and its opposite end forked or bifurcated, the fork members being in the form of reversely-disposed lapped hooks, which are separated by an interspace sufficient to receive a ring in an edgewise position, the bills of the lapped hooks being terminated short of the back of the bifurcation and directed laterally inward, so as to lie in the planes of the respective lapped hooks, and also overlapped in a plane at substantially right angles to the planes of the hooks.

Although the present hook has been particularly designed for engagement with bit-rings, so as to facilitate engagement and disengagement therewith and also to obviate accidental disconnection, it will of course be understood that the hook may be used wherever desirable upon other parts of the harness, and, in fact, is useful in any capacity, whether in connection with harness or otherwise.

What I claim is—

A hook, comprising a shank having a pair of substantially parallel reversely-disposed hook-shaped fork members separated by a longitudinal interspace to allow for the insertion of a ring or other object throughout said space, the bill of each hook overlapping the body portion of the other hook and terminating short of the juncture of the fork members and the shank, the terminals of the bill being directed inwardly in opposite directions in the horizontal planes of the respective fork members and arranged out of contact, but extending across each other so as to intersect the medial line of the hook.

In testimony that I claim the foregoing as my own I have hereto affixed my signature in the presence of two witnesses.

JESSE JUDSON FELDER.

Witnesses:
W. R. HOWELL,
W. T. TALIAFERRO.